(12) United States Patent
Casanova

(10) Patent No.: US 7,780,009 B2
(45) Date of Patent: Aug. 24, 2010

(54) MODULAR BATTERY PACKAGE

(75) Inventor: Julio Casanova, Avon Lake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 1459 days.

(21) Appl. No.: 10/789,858

(22) Filed: Feb. 27, 2004

(65) Prior Publication Data
US 2005/0191544 A1 Sep. 1, 2005

(51) Int. Cl.
*B65D 85/00* (2006.01)
(52) U.S. Cl. ........................ 206/705; 206/471
(58) Field of Classification Search ......... 206/461–471, 206/806, 703–705
See application file for complete search history.

(56) References Cited

U.S. PATENT DOCUMENTS

| | | |
|---|---|---|
| 2,917,216 A | 9/1957 | Despres |
| 2,984,401 A | 5/1961 | Herkender |
| 3,121,492 A | 2/1964 | De Paul et al. |
| 3,246,746 A | 4/1966 | Holley |
| 3,288,280 A | 11/1966 | Bostrom |
| 3,424,306 A | 1/1969 | Munck |
| 3,523,608 A | 8/1970 | Miller |
| 3,529,718 A * | 9/1970 | Zaremski ............ 206/469 |
| 3,659,706 A | 5/1972 | Serrell |
| 3,661,649 A | 5/1972 | Kaye |
| 3,737,029 A | 6/1973 | Serrell et al. |
| 3,743,084 A * | 7/1973 | Douglas ............ 206/532 |
| 3,820,655 A | 6/1974 | La Tourette et al. |
| 3,840,114 A | 10/1974 | Sama |
| 3,881,601 A | 5/1975 | Walus et al. |
| 3,884,350 A | 5/1975 | Johansson |
| 4,166,532 A | 9/1979 | Tsuchida et al. |
| 4,200,188 A | 4/1980 | Webinger |

(Continued)

FOREIGN PATENT DOCUMENTS

DE    004026899    2/1992

(Continued)

OTHER PUBLICATIONS

U.S. Appl. No. US 2001/0052478 entitled Package With Rotation Prevention, Publication Date Dec. 20, 2001, Inventors Julio C. Casanova et al.

(Continued)

*Primary Examiner*—Mickey Yu
*Assistant Examiner*—Jenine M Pagan
(74) *Attorney, Agent, or Firm*—Russell H. Toye, Jr.

(57) ABSTRACT

A package for batteries comprising at least two separate modules and a cover placed over the at least two separate modules. Each module includes a base having a first face and a second face, with each module further including at least one pocket extending outwardly from the first face. Each pocket is configured and sized to accept a battery therein. Two of the at least two separate modules have the first faces thereof facing each other, with at least one pocket of a first one of the two of the at least two separate modules being located between a pair of pockets of a second one of the two of the at least two separate modules. The at least two separate modules are easily separated upon removal of the cover from over the at least two separate modules.

41 Claims, 8 Drawing Sheets

U.S. PATENT DOCUMENTS

| | | | |
|---|---|---|---|
| 4,340,141 A * | 7/1982 | Fischer | 206/531 |
| 4,519,282 A | 5/1985 | Masino | |
| 4,696,402 A | 9/1987 | Harmon et al. | |
| 4,747,491 A | 5/1988 | Ward | |
| 4,848,568 A | 7/1989 | Eckelman | |
| 4,896,770 A * | 1/1990 | Calcerano et al. | 206/705 |
| 4,911,304 A | 3/1990 | Bunin | |
| 4,958,731 A | 9/1990 | Calcerano | |
| 4,971,197 A | 11/1990 | Worley | |
| 5,029,705 A | 7/1991 | Schmidt et al. | |
| 5,050,739 A | 9/1991 | Hannan et al. | |
| D320,930 S | 10/1991 | Richards | |
| 5,117,976 A | 6/1992 | Whitt et al. | |
| 5,311,989 A | 5/1994 | Ward et al. | |
| D359,900 S | 7/1995 | Hawthorne | |
| D359,960 S * | 7/1995 | Kennedy et al. | D14/249 |
| 5,485,919 A | 1/1996 | Samberg et al. | |
| D387,977 S | 12/1997 | Kallgren | |
| D391,156 S | 2/1998 | Stevens | |
| 5,823,350 A | 10/1998 | Ward | |
| 5,871,100 A | 2/1999 | Ward | |
| 5,899,333 A | 5/1999 | Williams et al. | |
| 5,957,358 A | 9/1999 | Getz et al. | |
| D417,146 S | 11/1999 | St. Pierre et al. | |
| 6,029,818 A | 2/2000 | Kumakura et al. | |
| D421,899 S | 3/2000 | Eneroth et al. | |
| D423,344 S | 4/2000 | Kumakura et al. | |
| D423,928 S | 5/2000 | Kumakura et al. | |
| D432,411 S | 10/2000 | Pirro et al. | |
| D432,908 S | 10/2000 | Pirro et al. | |
| D432,909 S | 10/2000 | Pirro et al. | |
| D433,628 S | 11/2000 | Tamura | |
| D433,936 S | 11/2000 | Pirro et al. | |
| 6,206,172 B1 | 3/2001 | Abe | |
| D444,379 S | 7/2001 | Assargren et al. | |
| 6,253,920 B1 | 7/2001 | Kallgren | |
| D449,779 S | 10/2001 | Otto | |
| D450,239 S | 11/2001 | Otto | |
| D451,014 S | 11/2001 | Otto | |
| D451,015 S | 11/2001 | Otto | |
| 6,349,390 B1 * | 2/2002 | Dell et al. | 714/6 |
| 6,364,115 B1 | 4/2002 | Casanova et al. | |
| 6,427,841 B2 | 8/2002 | Wani et al. | |
| 6,439,390 B1 | 8/2002 | Kumakura et al. | |
| 6,513,656 B2 | 2/2003 | Hanaoka et al. | |
| D478,810 S | 8/2003 | Wilson | |
| D479,125 S | 9/2003 | Kumakura et al. | |
| D479,126 S | 9/2003 | Kumakura et al. | |
| D479,688 S | 9/2003 | Kumakura et al. | |
| D482,970 S | 12/2003 | Kumakura et al. | |
| 2003/0034274 A1 | 2/2003 | Morita et al. | |

FOREIGN PATENT DOCUMENTS

| | | |
|---|---|---|
| EP | 0118975 | 9/1984 |
| EP | 1270445 | 1/2003 |
| FR | 1550230 | 12/1968 |
| GB | 2247668 | 3/1992 |
| JP | 59148271 | 8/1984 |
| JP | 06140008 | 5/1994 |
| JP | 11124130 | 5/1999 |
| JP | 02001253471 | 9/2001 |
| JP | 2002343321 | 11/2002 |
| JP | 2003072837 | 3/2003 |
| WO | 0030189 | 5/2000 |
| WO | 0198170 | 12/2001 |
| WO | WO01/98171 | 12/2001 |

OTHER PUBLICATIONS

U.S. Appl. No. US 2001/0040115 entitled Battery Package, Publication Date Nov. 15, 2001, Inventors Yoshiaki Wani et al.

* cited by examiner

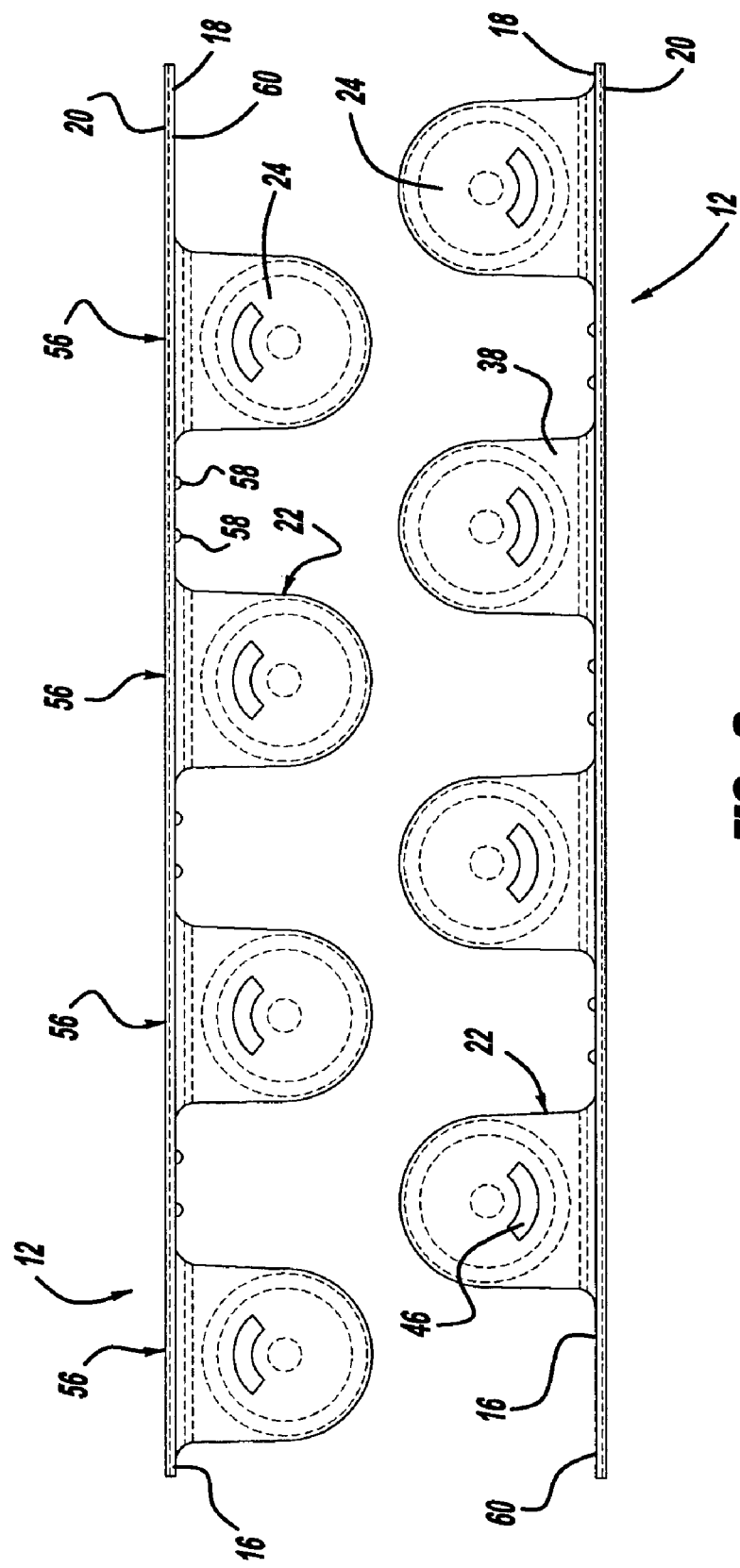

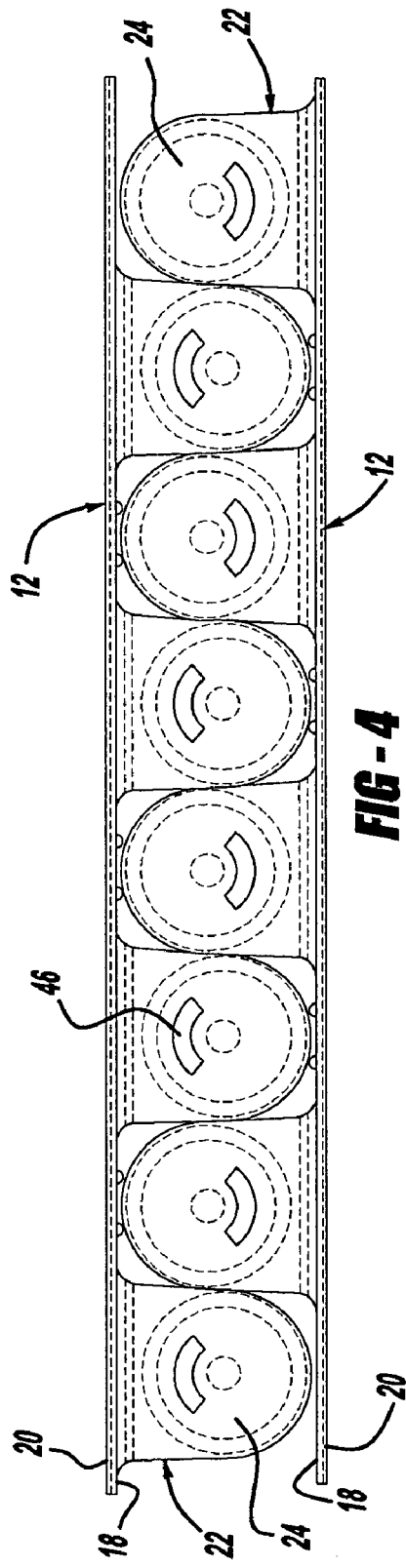
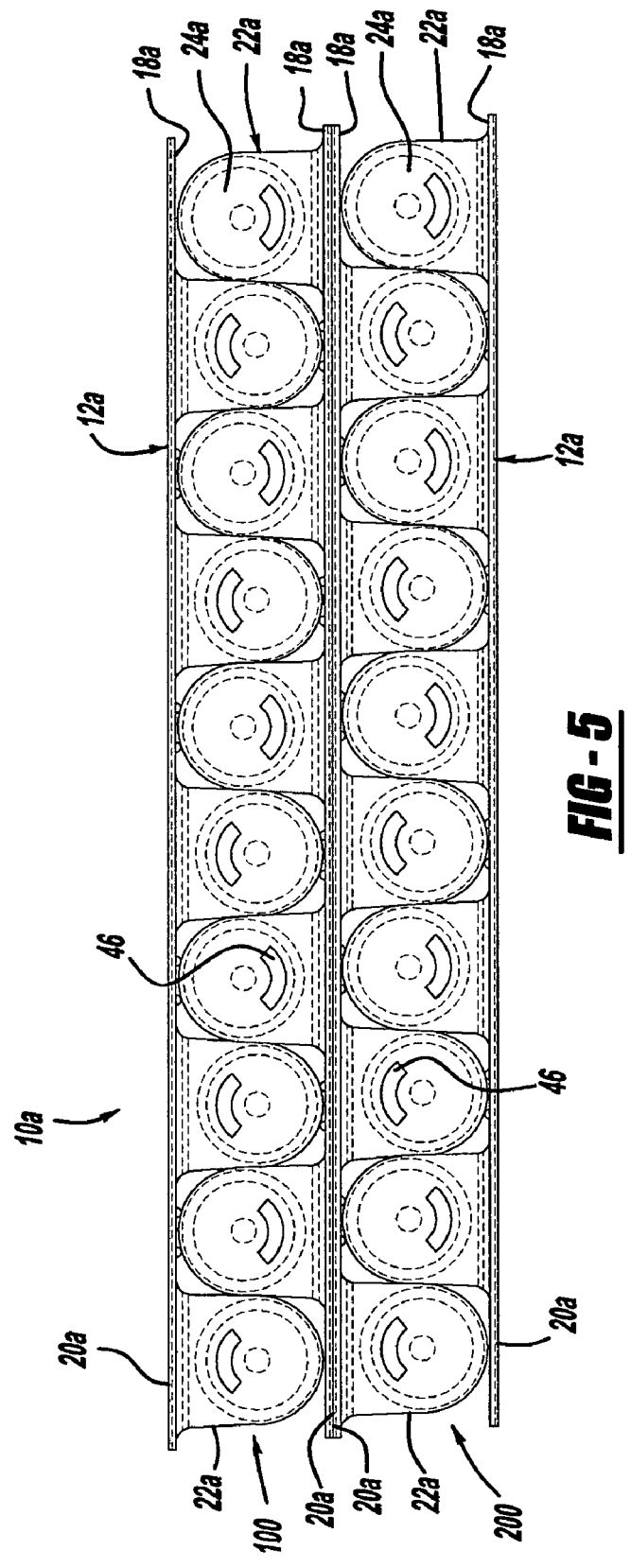

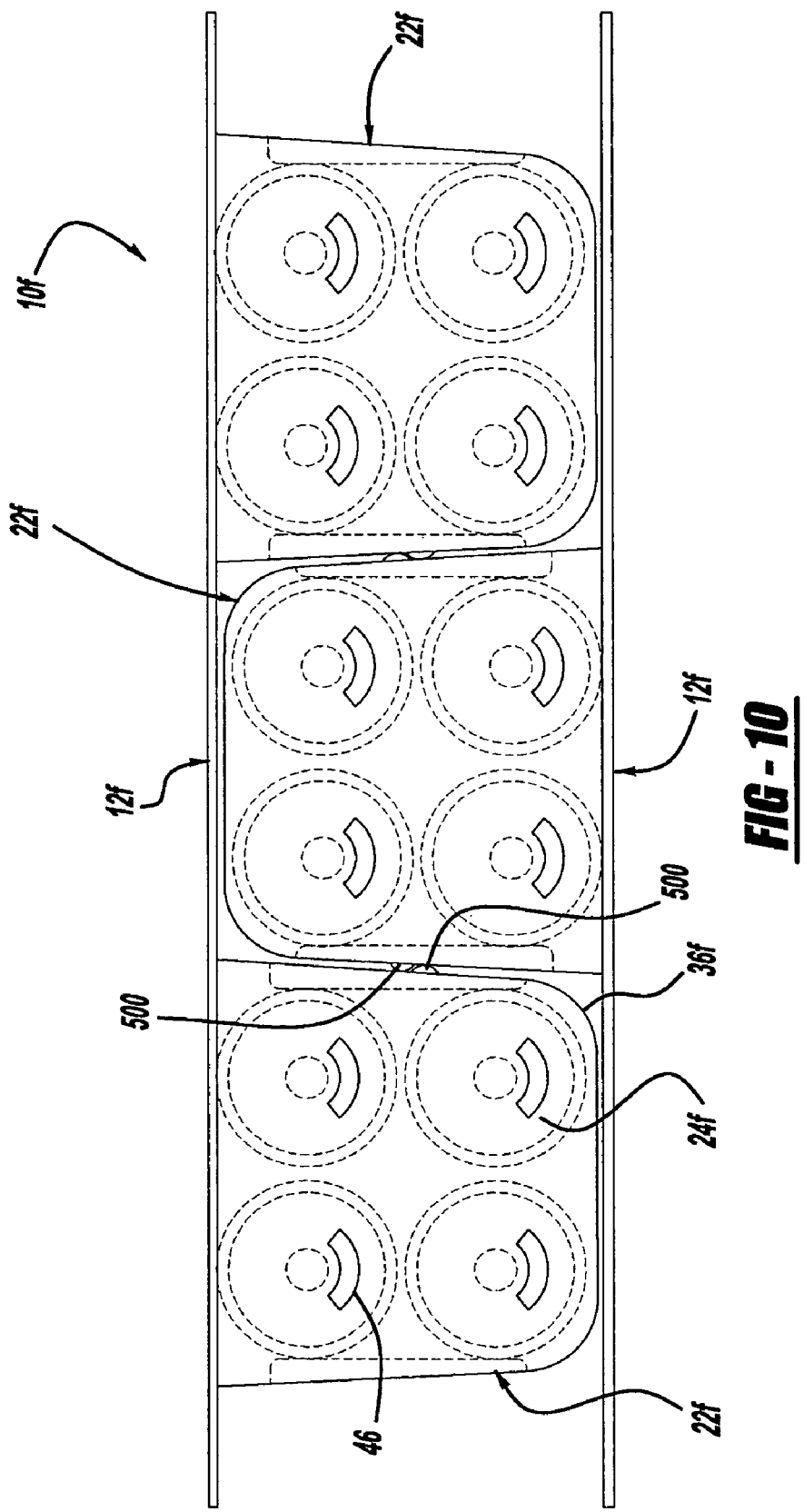

MODULAR BATTERY PACKAGE

BACKGROUND

The present invention concerns packaging, and more particularly relates to packaging for batteries.

Electrochemical cells (i.e., batteries) are commonly employed to supply voltage for electrically operated devices, particularly for portable electrically operated devices. Currently, a number of popular alkaline cells of the generally cylindrical shape are commercially available in industry-recognized, standard sizes, including D-, C-, AA- and AAA-size cells, as well as other sizes and configurations.

Heretofore, batteries have been shipped and displayed in stores in battery packages having a cardboard backing and a battery receptacle portion holding the batteries. The cardboard backing has been a single board or card. The single board is typically rectangular, with edges of the board being adjacent the periphery of the battery receptacle portion. Information about the manufacturer of the batteries and the typical devices for use with the batteries are typically located on the rear face of the board.

Another packaging for batteries has included lining up a row of batteries and shrink wrapping a plastic sleeve over the batteries. Sometimes, a card is positioned between the batteries and the plastic sleeve, wherein the card covers a front and a bottom of the row of batteries. Furthermore, some of these battery packages have more than one row of batteries. In order to access the batteries in the battery package in the sleeve, the sleeve is torn to allow the batteries to fall free. In order to assist in removing the batteries from the sleeved package, the sleeve sometimes has perforations such that portions of the sleeve are easily torn. However, once the sleeve is opened, the batteries within the sleeve typically fall out during any movement of the sleeve. Furthermore, the batteries within the sleeve, either before or after the sleeve is torn, have a tendency to rotate. Accordingly, it can be difficult to maintain the alignment of the batteries within the sleeve during shipping and sale of the sleeved batteries.

Accordingly, a battery package is desired having the aforementioned advantages and solving and/or making improvements on the aforementioned disadvantages.

SUMMARY OF THE PRESENT INVENTION

An aspect of the present invention is to provide a battery package comprising at least two separate modules and a cover placed over the at least two separate modules. Each module includes a base having a first face and a second face, with each module further including at least one pocket extending outwardly from the first face. At least one battery is placed into each pocket. Two of the at least two separate modules have the first faces thereof facing each other, with at least one pocket of a first one of the two of the at least two separate modules being located between a pair of pockets of a second one of the two of the at least two separate modules. The at least two separate modules easily separate upon removal of the cover from over the at least two separate modules.

Yet another aspect of the present invention is to provide a method of packaging batteries comprising providing at least two separate modules, with each module including a base having a first face and a second face and each module further including at least one pocket extending outwardly from the first face. The method also includes placing at least one battery in each pocket. The method further includes positioning the first face of at least two of the plurality of separate modules facing each other, with at least one pocket of a first one of the at least two of the at least two separate modules being located between a pair of pockets of a second one of the at least two of the at least two separate modules. Furthermore, the method includes placing a cover over the at least two separate modules.

These and other aspects, objects, and features of the present invention will be understood and appreciated by those skilled in the art upon studying the following specification, claims, and appended drawings.

BRIEF DESCRIPTION OF DRAWINGS

FIG. 3 is an exploded top view of two modules of the modular battery package of the present invention.

FIG. 4 is a top view of two modules of the modular battery package of the present invention.

FIG. 5 is a top view of four modules of a second embodiment of the modular battery package of the present invention.

FIG. 10 is a top view of two modules of the modular battery package of the present invention with retainers for maintaining the two modules together.

DETAILED DESCRIPTION OF PREFERRED EMBODIMENTS

Figure 1:
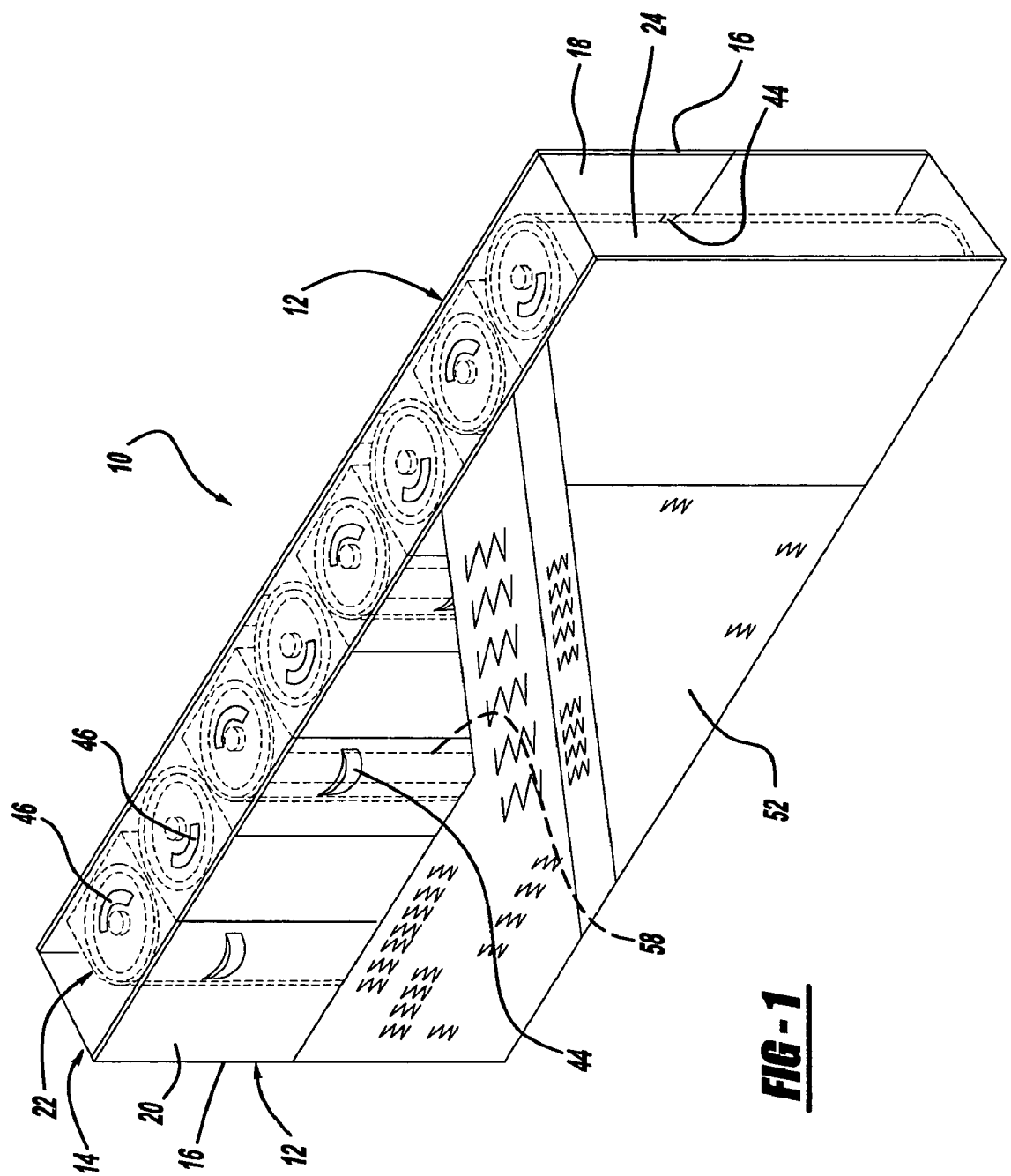
FIG. 1 is a perspective view of a modular battery package of the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
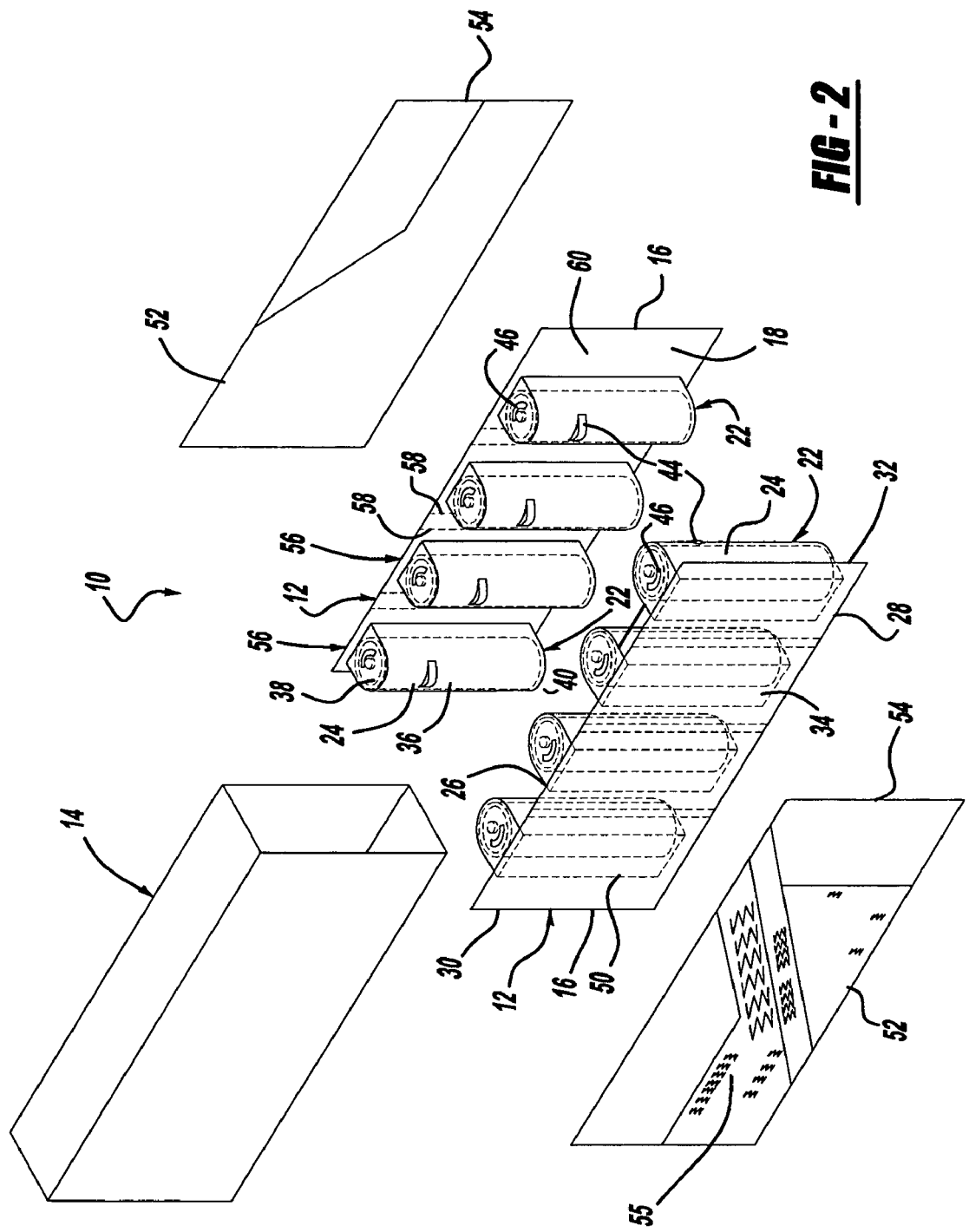
FIG. 2 is an exploded perspective view of the modular battery package of the present invention.

The reference number 10 (FIGS. 1-2) generally designates a battery package embodying the present invention. In the illustrated example, the battery package 10 comprises at least two separate modules 12 and a cover 14 placed over the at least two separate modules 12. Each module 12 includes a base 16 having a first face 18 and a second face 20, with each module 12 further including at least one pocket 22 extending outwardly from the first face 18. Each pocket 22 is configured and sized to accept a battery 24 therein. Two of the at least two separate modules 12 have the first faces 18 thereof facing each other, with at least one pocket 22 of a first one of the two of the at least two separate modules 12 being located between a pair of pockets 22 of a second one of the two of the at least two separate modules 12. The at least two separate modules 12 are easily separated upon removal of the cover 14 from over the at least two separate modules 12.

Each illustrated module 12 is configured to hold at least one battery 24. The module 12 in one embodiment is rectangular and comprises the base 16 having the first face 18, the second face 20, a top edge 26, a bottom edge 28, a first side edge 30 and a second side edge 32. According to one embodiment, the modules 12 are made of polyethylene terephthalate (PET). The modules 12 include a plurality of the pockets 22 extending outwardly from the first face 18 and accessible through the second face 20. In one embodiment, the pockets 22 are evenly spaced and aligned in a single row on the base 16. It is contemplated that the modules 12 could have any number of pockets 22. In the illustrated embodiment, the modules 12 are identical and have the same number of pockets 22. However, it is contemplated that the modules 12 could have an unequal number of pockets 22. For example, a first module 12 could have one pocket 22 and a second module 12 could have two pockets 22, with the one pocket 22 of the first module being located between the two pockets 22 of the second module 12. Numerous other combinations are contemplated.

In the illustrated example, the modules 12 each include four pockets 22 having batteries 24 placed therein. The pockets 22 include an entrance 34 accessible through the second face 20 of the module 12. The entrance 34 is substantially rectangular for allowing one of the industry-recognized, standard sized alkaline cells of the generally cylindrical shape (e.g., AA or AAA) or bar shape (e.g., 9 volt) there through for placement into the pockets 22. The pockets 22 have a generally inverted U-shaped shell comprising a U-shaped front wall 36 extending from the entrance 34, a top wall 38 and a bottom wall 40. According to one embodiment, the pockets 22 include a non-rotational feature for maintaining batteries 24 in place therein in a selected rotated position. In the illustrated example, the non-rotational feature comprises a pair of first tabs 44 extending into the pocket 22 from the front wall 36, a second tab 46 extending from the top wall 38 and a third tab extending from the bottom wall 40. The first tabs 44, the second tab 46 and the third tab (not shown) frictionally engage the battery 24 as the battery 24 is placed within the pocket 22. Therefore, the battery 24 is maintained in position within the pocket 22 and maintained in a selected rotated position. Accordingly, all of the batteries 24 in one of the modules 12 can face the same direction. The non-rotational feature as disclosed herein is disclosed in U.S. Pat. No. 6,364,115 entitled BATTERY PACKAGE WITH ROTATION PREVENTION, the entire contents of which are hereby incorporated herein by reference. However, it is contemplated that the non-rotational feature could include any one of the tabs or any other method of preventing rotation of the batteries 26.

Each illustrated module 12 includes a lid 50 covering the second face 20 of the base 16 for maintaining the batteries 24 within the pockets 22. In one embodiment, the lid 50 is comprised of a sheet of PET or foil adhered to the second face 20 of the base 16. The lid 50 can be transparent, translucent or opaque. The lid 50 can also have writing (e.g., advertising) thereon. A card 52 is placed over the lid 50 of the module 12. According to one embodiment, the card 52 includes a card periphery 54 coextensive of a periphery of the module 12 defined by the top edge 26, the bottom edge 28, the first side edge 30 and the second side edge 32 of the module 12. However, the card 52 could have any shape, in one embodiment smaller than a boundary defined by the top edge 26, the bottom edge 28, the first side edge 30 and the second side edge 32 of the base 16. The card 52 can also have writing 55 (e.g., advertising) thereon. Although each module 12 is illustrated as including the lid 50 adhered to the second face 20 of the base 16 and the card 52 covering the lid 50, it is contemplated that each module 12 could have either both the lid 50 and the card 52, the lid 50 only or the card 52 only.

In the illustrated example, the modules 12 can be separated into a plurality of pods 56, with each pod 56 including at least one battery 24. Each module 12 includes perforations 58 between each pocket 22. The perforations 58 allow the pods 56 of the modules 12 to be separated from a remainder of the module 12 by tearing the module 12 along one of the perforations 58. In the illustrated example, each module 12 includes a pair of lines of perforations 58, although it is contemplated that only one line of perforations 58 could be used. Furthermore, although perforations 58 are used to easily separate the pods 56, it is contemplated that other means could be employed to easily separate the pods 56 (e.g., a line of weakened material between the pockets 22). Moreover, although each pod 56 is illustrated as including one pocket 22, it is contemplated that the pods 56 could include more than one pocket 22 (e.g., wherein there is no perforation between every pair of pockets 22). In one embodiment, the perforations 58 extend through the base 16 and the lid 50.

The illustrated modules 12 are engaged by positioning the first faces 18 of the modules 12 such that they face each other and by placing at least one of the pockets 22 of the first one of the modules 12 between a pair of pockets 22 of the second one of the modules 12 (FIGS. 3-4). According to one embodiment, the space between the pair of the pockets 22 of the second one of the modules 12 is substantially similar to the space encompassed by the pocket 22 of the first one of the modules 12 to minimize space. In the illustrated example, three pockets 22 of each module 12 are positioned between a pair of pockets 22 on the other module 12. Furthermore, each module 12 includes an extension 60 of the base 16 at one side thereof, such that the bases 16 of the modules 12 are aligned once the modules 12 are engaged.

In the illustrated example, the cover 14 is placed over the at least two separate modules 12 after the modules 12 are engaged. According to one embodiment, the cover 14 includes a transparent sheet of PET that is shrink wrapped over the modules 12 after the modules 12 are engaged. However, it is contemplated that the cover 14 could be made of any material (e.g., a cardboard box). In the illustrated example, the cover 14 covers all six sides of the engaged modules 12. However, it is contemplated that the cover 14 could only cover four sides of the engaged modules 12. For example, the cover 14 could comprise one or more thin bands placed over four sides of the engaged modules 12. It is further contemplated that the cover 14 could include a perforation (not shown) for easily removing the cover 14 from the modules 12. Once the cover 14 is removed, the modules 12 will easily separate. In the illustrated example, the illustrated battery package 10 includes eight total batteries 24, one for each pocket 22 of each module 12. However, it is contemplated that each module 12 could include any number of pockets 22 (e.g., 2, 3, 4, etc.).

The reference numeral 10a (FIG. 5) generally designates another embodiment of the present invention, having a second embodiment for the battery package. Since battery package 10a is similar to the previously described battery package 10, similar parts appearing in FIGS. 1-4 and FIG. 5, respectively, are represented by the same, corresponding reference number, except for the suffix "a" in the numerals of the latter. The second embodiment of the battery package 10a is identical to the first embodiment of the battery package 10, except that each module 12a includes five pockets 22a, with each pocket 22a including one battery 24a. Furthermore, instead of two total modules 12 as in the first embodiment of the battery package 10, the second embodiment of the battery package 10a includes four total modules 12a. Therefore, the second embodiment of the battery package 10a includes a first pair 100 of modules 12a and a second pair 200 of modules 12a.

In this illustrated example, each pair of modules 12a have the first faces 18a thereof facing each other, with at least one pocket 22a of a first one of the modules 12a being located between a pair of pockets 22a of a second one of the modules 12a. Additionally, the second faces 20a (and/or lid 50a and/or card 52a) of one of the modules 12a from each pair of the modules 12 face each other. Accordingly, when the cover (not shown) is placed over the two pairs of modules 12a of the second embodiment of the battery package 10a, the battery package 10a will include a total of twenty batteries 24a. However, as stated above, it is contemplated that each module 12a could include any number of pockets 22a (e.g., 2, 3, 4, etc.), thereby providing the battery package 10a with any number of pockets 22a (e.g., twelve total pockets 22a if each module 12a has three pockets 22a, sixteen total pockets 22a if each module has four pockets 22a, etc.).

Figure 6:
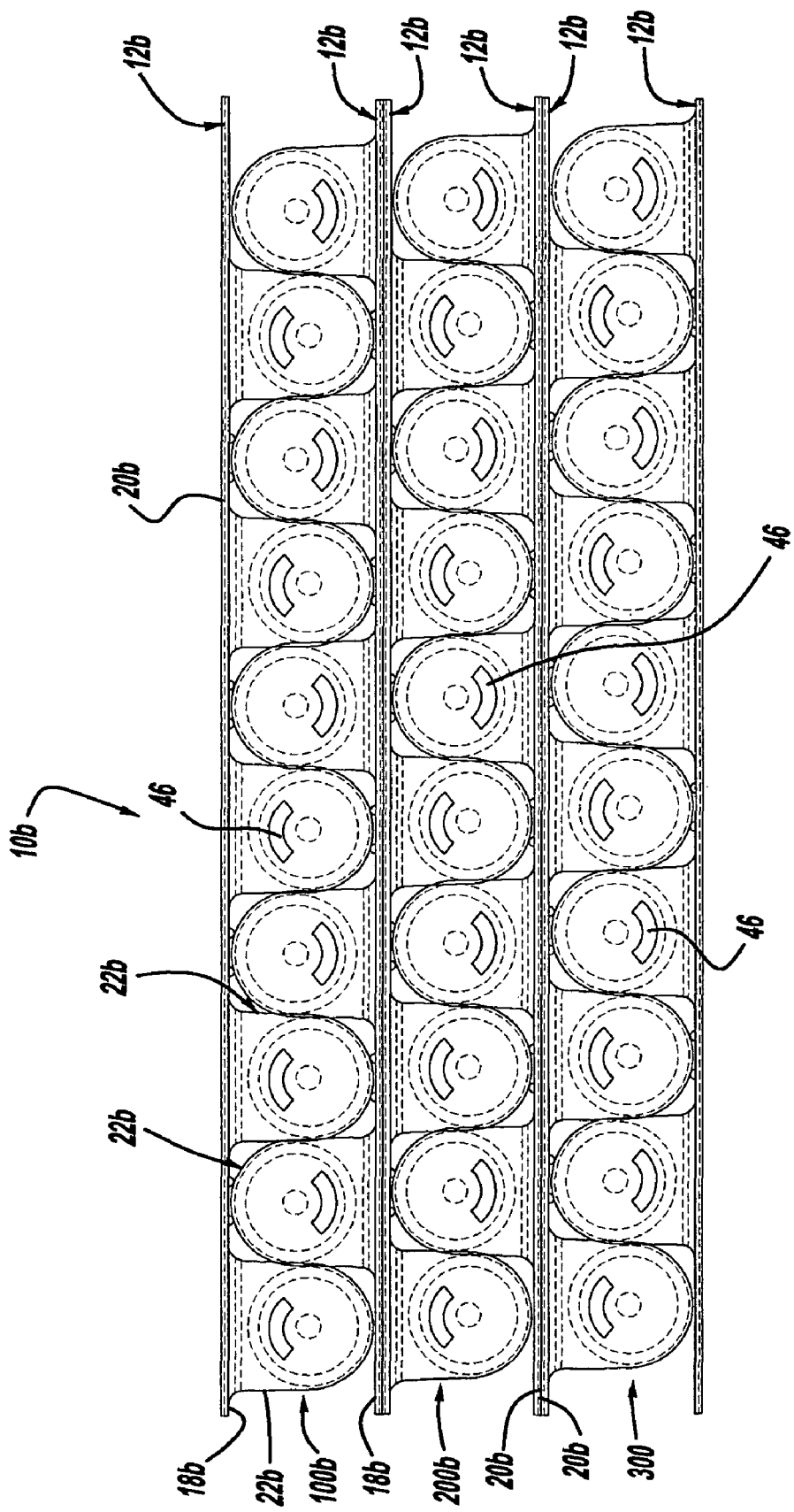
FIG. 6 is a top view of six modules of a third embodiment of the modular battery package of the present invention.

The reference numeral 10b (FIG. 6) generally designates another embodiment of the present invention, having a third embodiment for the battery package. Since battery package 10b is similar to the previously described battery package 10a, similar parts appearing in FIG. 5 and FIG. 6, respectively, are represented by the same, corresponding reference number, except for the suffix "b" in the numerals of the latter. The third embodiment of the battery package 10b is identical to the second embodiment of the battery package 10a, except that instead of four total modules 12a as in the second embodiment of the battery package 10, the third embodiment of the battery package 10b includes six total modules 12b. Therefore, the third embodiment of the battery package 10b includes a first pair 100b of modules 12b, a second pair 200b of modules 12b and a third pair 300 of modules.

In the illustrated example, each pair of modules 12b have the first faces 18b thereof facing each other, with at least one pocket 22b of a first one of the modules 12b being located between a pair of pockets 22b of a second one of the modules 12b. Additionally, the second faces 20b (and/or lid 50b and/or card 52b) of one of the modules 12b from the first pair 100b and third pair 300 of the modules 12b face one of the second faces 20b (and/or lid 50b and/or card 52b) of the modules 12b from the second pair 200b of modules 12b. Accordingly, when the cover (not shown) is placed over the three pairs of modules 12b of the third embodiment of the battery package 10b, the battery package 10b will include a total of thirty batteries 24b. However, as stated above, it is contemplated that each module 12b could include any number of pockets 22b (e.g., 2, 3, 4, etc.), thereby providing the battery package 10b with any number of pockets 22b (e.g., eighteen total pockets 22b if each module 12b has three pockets 22b, twenty-four total pockets 22b if each module has four pockets 22b, etc.). Furthermore, it is contemplated that any number of pairs of modules 12b or any number of pair of modules 12b with an unpaired module 12b could be used.

The reference numeral 10c (FIG. 7) generally designates another embodiment of the present invention, having a fourth embodiment for the battery package. Since battery package 10c is similar to the previously described battery package 10, similar parts appearing in FIGS. 1-4 and FIG. 7, respectively, are represented by the same, corresponding reference number, except for the suffix "c" in the numerals of the latter. The fourth embodiment of the battery package 10c is identical to the first embodiment of the battery package 10, except that each pocket 22c includes more than one battery 24c.

Figure 7:
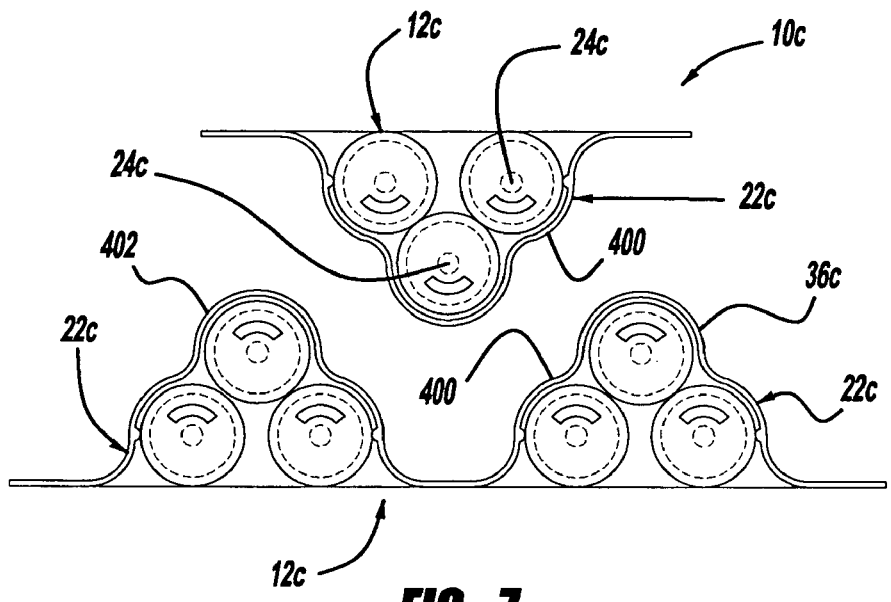
FIG. 7 is a top view of two modules of a fourth embodiment of the modular battery package of the present invention.

As illustrated in FIG. 7, each pocket 22c includes three batteries 24c therein. However, it is contemplated that any number of batteries 24c could be in each pocket 22c. In the illustrated example, the front wall 36c is stepped and includes a pair of ledges 400 and a tip 402. When the modules 12c are engaged, the tip 402 of a first one of the modules 12c is located between the two of the pockets 22c on a second one of the modules 12c and the ledges 400 of the first one of the modules 12c abuts ledges 400 of adjacent pockets 22c of the second one of the modules. However, it is contemplated that the pockets 22c could have any configuration and the front walls 36c of the pockets 22c could engage in any manner.

Figure 8:
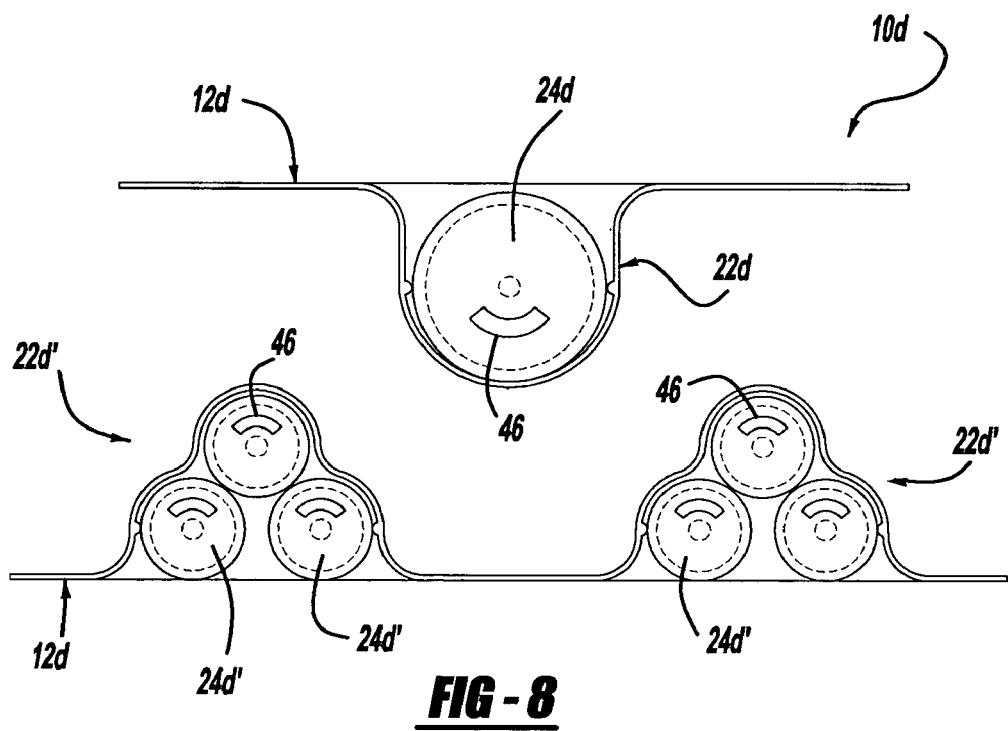
FIG. 8 is a top view of two modules of a fifth embodiment of the modular battery package of the present invention.

The reference numeral 10d (FIG. 8) generally designates another embodiment of the present invention, having a fifth embodiment for the battery package. Since battery package 10d is similar to the previously described battery package 10, similar parts appearing in FIGS. 1-4 and FIG. 8, respectively, are represented by the same, corresponding reference number, except for the suffix "d" in the numerals of the latter. The fifth embodiment of the battery package 10d is identical to the first embodiment of the battery package 10, except that each module includes pockets 22d having different configurations. As illustrated in FIG. 8, a first one of the modules 12d has a pocket 22d with one battery 24d (e.g., the industry-recognized, standard D-sized alkaline cell of the generally cylindrical shape) and a second one of the modules 12d includes pockets 22d' with four batteries 24d' therein (e.g., the industry-recognized, standard AA-sized alkaline cells of the generally cylindrical shape). However, it is contemplated that any number of batteries 24d could be in each pocket 22d.

As illustrated in FIG. 8, each pocket 22d of a first one of the modules 12d includes one battery 24d therein and each pocket 22d' of a second one of the modules 12d includes three batteries 24d' therein. The illustrated pocket 22d of the first one of the modules 12d is identical in shape to the pockets 22 of the first embodiment of the battery package 10. Likewise, the illustrated pockets 22d' of the second one of the modules 12d are identical in shape to the pockets 22c of the fourth embodiment of the battery package 10c. In the illustrated example, when the modules 12c are engaged, the pocket 22d of the first one of the modules 12d is located between the two pockets 22d' on the second one of the modules 12d. However, it is contemplated that the pockets 22d, 22d' could have any configuration and the front walls 36c of the pockets 22d, 22d' could engage in any manner.

The reference numeral 10e (FIG. 9) generally designates another embodiment of the present invention, having a sixth embodiment for the battery package. Since battery package 10e is similar to the previously described battery package 10c, similar parts appearing in FIG. 7 and FIG. 9, respectively, are represented by the same, corresponding reference number, except for the suffix "e" in the numerals of the latter. The illustrated sixth embodiment of the battery package 10e is substantially identical to the fourth embodiment of the battery package 10c, except that each pocket 22e includes batteries 24e of different sizes.

Figure 9:
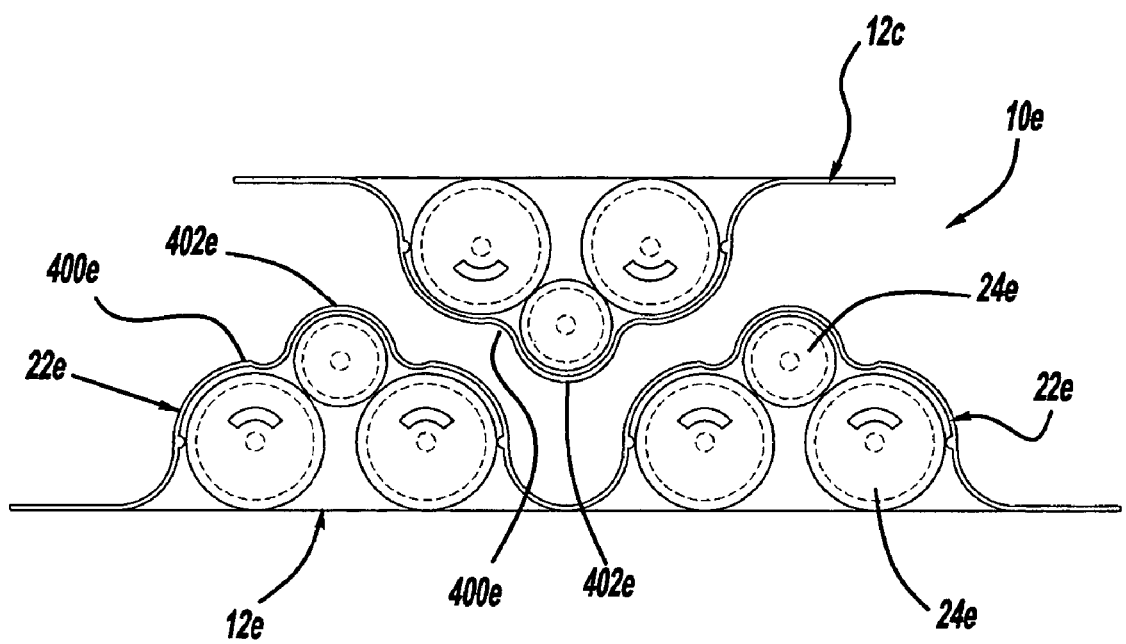
FIG. 9 is a top view of two modules of a sixth embodiment of the modular battery package of the present invention.

As illustrated in FIG. 9, each pocket 22e includes three batteries 24e therein (two larger batteries and one smaller battery resting on the two larger batteries). However, it is contemplated that any number of batteries 24e could be in each pocket 22e. When the modules 12e are engaged, the tip 402e (with the smaller battery therein) of a first one of the modules 12e is located between the two of the pockets 22e on a second one of the modules 12e and the ledges 400e of the first one of the modules 12e abuts ledges 400e of adjacent pockets 22e of the second one of the modules 12e. However, it is contemplated that the pockets 22e could have any configuration and the front walls 36e of the pockets 22e could engage in any manner.

The reference numeral 10f (FIG. 10) generally designates another embodiment of the present invention, having a seventh embodiment for the battery package. Since battery package 10f is similar to the previously described battery package 10c, similar parts appearing in FIG. 7 and FIG. 10, respectively, are represented by the same, corresponding reference number, except for the suffix "f" in the numerals of the latter. The sixth embodiment of the battery package 10f is identical to the fourth embodiment of the battery package 10c, except that each pocket 22f includes four batteries 24f, each pocket 22f has substantially a trapezoidal configuration and an outside of each front wall 36f includes an elongated tab 500.

As illustrated in FIG. 10, when the modules 12f are engaged, each elongated tab 500 on a first one of the modules 12f snaps under elongated tabs 500 on the second one of the modules 12f. Therefore, the tabs 500 maintain the modules 12f in position relative to each other until a small force moves the modules 12f away from each other. Nevertheless, the modules 12f will remain to be easily separable upon removal of the cover (not shown) from over the modules 12f. The protrusions or tabs 500 as disclosed herein are disclosed in U.S. Ser. No. 10/438,428 entitled HANGABLE PACKAGE STRUCTURE, the entire contents of which are hereby incorporated herein by reference.

In the battery package 10 of the present invention, each battery 24 or set of batteries 24 can be individually packaged in one of the pockets 22, thereby allowing each pod 56 to include a fresh battery 24 or set of batteries 24. Furthermore, all of the batteries 24 in the pockets 22 can have the same orientation. Once the cover 14 is removed, the pods 56 can easily be separated from the remainder of the module 12, thereby allowing quick and easy portability of the pods 56 and batteries 24 therein. Additionally, the cards 52 can easily be interchanged for different battery packages 10, thereby allowing battery information to be added to cards 52. Furthermore, any of the above embodiments can be mixed together. For example, the battery package 10e with modules 12e with batteries 24e of different sizes therein can include one or more pairs of modules 12e as disclosed in the second and third embodiments of the battery package 10a and 10b.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A battery package comprising:
at least two separate modules, each module including a base having a first face and a second face, each module further including at least one pocket extending outwardly from the first face;
at least one battery placed into each pocket; and
a cover placed over the at least two separate modules;
two of the at least two separate modules have the first faces thereof facing each other, with at least one pocket of a first one of the two of the at least two separate modules being located between a pair of pockets of a second one of the two of the at least two separate modules;
wherein the at least two separate modules will easily separate upon removal of the cover from over the at least two separate modules; and
wherein none of the modules are able to be removed from within the cover while the cover is over all of the at least two separate modules.

2. The battery package of claim 1, wherein:
the at least two separate modules comprise at least three separate modules.

3. The battery package of claim 1, wherein:
each module includes a lid over the second face of the base.

4. The battery package of claim 3, wherein:
the lid is transparent.

5. The battery package of claim 3, wherein:
the base and the lid each include perforations between each of the pockets, whereby each pocket of each module can easily be separated from a remainder of the module by tearing the module along one of the perforations.

6. The battery package of claim 3, further including:
a card positioned over the lid and the second face of each module.

7. The battery package of claim 1, further including:
a card positioned over the second face of each module.

8. The battery package of claim 1, wherein:
each pocket includes a non-rotation feature for maintaining batteries in place therein in a selected rotated position.

9. The battery package of claim 8, wherein:
the non-rotation feature comprises at least one tab extending into the pocket, the at least one tab being configured to frictionally engage the battery placed within the pocket.

10. The battery package of claim 1, wherein:
each of the modules are identical.

11. The battery package of claim 1, wherein:
each module includes only four pockets.

12. The battery package of claim 1, wherein:
each module includes only five pockets.

13. The battery package of claim 1, wherein:
every pocket on one of the at least two modules is identical.

14. The battery package of claim 13, wherein:
every pocket is identical.

15. The battery package of claim 1, wherein:
at least two of the pockets have different configurations.

16. The battery package of claim 1, wherein:
at least two of the batteries have different configurations.

17. The battery package of claim 1, wherein:
at least one pocket includes batteries having a different configuration therein.

18. The battery package of claim 1, wherein:
each pocket includes more than one battery therein.

19. The battery package of claim 1, wherein:
each module includes perforations between each pocket.

20. The battery package of claim 1, wherein:
each module includes the pockets in a single row.

21. A battery package comprising:
at least two separate modules, each module including a base having a first face and a second face, each module further including at least one pocket extending outwardly from the first face;
at least one battery placed into each pocket; and
a cover placed over the at least two separate modules;
two of the at least two separate modules have the first faces thereof facing each other, with at least one pocket of a first one of the two of the at least two separate modules being located between a pair of pockets of a second one of the two of the at least two separate modules;
wherein the at least two separate modules will easily separate upon removal of the cover from over the at least two separate modules;
wherein the cover comprises shrink wrap plastic.

22. A method of packaging batteries comprising:
providing at least two separate modules, each module including a base having a first face and a second face, each module further including at least one pocket extending outwardly from the first face;
placing at least one battery in each pocket;
positioning the first face of at least two of the plurality of separate modules facing each other, with at least one pocket of a first one of the at least two of the at least two separate modules being located between a pair of pockets of a second one of the at least two of the at least two separate modules; and
placing a cover over the at least two separate modules;
wherein none of the modules are able to be removed from within the cover while the cover is over all of the at least two separate modules.

23. The method of packaging batteries of claim 22, further including:
placing a lid over the second face of the base of each module.

24. The method of packaging batteries of claim 23, wherein:
the lid is transparent.

25. The method of packaging batteries of claim 23, further including:
making perforations in the base and the lid between each of the pockets, whereby each pocket of each module can easily be separated from a remainder of the module by tearing the module along one of the perforations.

26. The method of packaging batteries of claim 23, further including:
positioning a card over the lid and the second face of each module.

27. The method of packaging batteries of claim 22, further including:
a card positioned over the second face of each module.

28. The method of packaging batteries of claim 22, further including:
providing each pocket with a non-rotation feature; and
maintaining batteries in place in the pockets in a selected rotated position.

29. The method of packaging batteries of claim 28, wherein:
the non-rotation feature comprises at least one tab extending into the pocket, and further including frictionally engaging the battery placed within the pocket with the at least one tab.

30. The method of packaging batteries of claim 22, wherein:
each of the modules are identical.

31. The method of packaging batteries of claim 22, wherein:
each module includes only four pockets.

32. The method of packaging batteries of claim 22, wherein:
each module includes only five pockets.

33. The method of packaging batteries of claim 22, wherein:
every pocket on one of the at least two modules is identical.

34. The method of packaging batteries of claim 33, wherein:
every pocket is identical.

35. The method of packaging batteries of claim 22, wherein:
at least two of the pockets have different configurations.

36. The method of packaging batteries of claim 22, wherein:
at least two of the batteries have different configurations.

37. The method of packaging batteries of claim 22, wherein:
at least one pocket includes batteries having a different configuration therein.

38. The method of packaging batteries of claim 22, wherein:
each pocket includes more than one battery therein.

39. The method of packaging batteries of claim 22, further including:
perforating each module between each pocket.

40. The method of packaging batteries of claim 22, wherein:
each module includes the pockets in a single row.

41. A method of packaging batteries comprising:
providing at least two separate modules, each module including a base having a first face and a second face, each module further including at least one pocket extending outwardly from the first face;
placing at least one battery in each pocket;
positioning the first face of at least two of the plurality of separate modules facing each other, with at least one pocket of a first one of the at least two of the at least two separate modules being located between a pair of pockets of a second one of the at least two of the at least two separate modules; and
placing a cover over the at least two separate modules;
wherein placing the cover comprises shrink wrapping plastic over the at least two separate modules.

* * * * *